(12) United States Patent
Hasselgren et al.

(10) Patent No.: US 10,373,370 B2
(45) Date of Patent: Aug. 6, 2019

(54) METHOD, APPARATUS, AND COMPUTER PROGRAM PRODUCT FOR IMPROVED GRAPHICS PERFORMANCE

(71) Applicant: Intel Corporation, Santa Clara, CA (US)

(72) Inventors: Jon N. Hasselgren, Bunkeflostrand (SE); Jacob J. Munkberg, Malmö (SE); Franz Petrik Clarberg, Lund (SE); Tomas G. Akenine-Moller, Lund (SE)

(73) Assignee: Intel Corporation, Santa Clara, CA (US)

( * ) Notice: Subject to any disclaimer, the term of this patent is extended or adjusted under 35 U.S.C. 154(b) by 84 days.

(21) Appl. No.: 15/396,569

(22) Filed: Dec. 31, 2016

(65) Prior Publication Data
US 2017/0109921 A1    Apr. 20, 2017

Related U.S. Application Data

(63) Continuation of application No. 12/864,113, filed as application No. PCT/SE2009/000022 on Jan. 23, 2009, now Pat. No. 9,947,130.
(Continued)

(51) Int. Cl.
*G06T 15/00* (2011.01)
*G06T 15/40* (2011.01)
(Continued)

(52) U.S. Cl.
CPC .............. *G06T 15/405* (2013.01); *G06T 1/60* (2013.01); *G06T 15/005* (2013.01); *G06T 15/40* (2013.01); *G06T 15/80* (2013.01); *G06T 2200/24* (2013.01)

(58) Field of Classification Search
None
See application file for complete search history.

(56) References Cited

U.S. PATENT DOCUMENTS

| | | |
|---|---|---|
| 5,757,321 A | 5/1998 | Billyard |
| 6,359,629 B1 | 3/2002 | Hopcroft et al. |
| (Continued) | | |

FOREIGN PATENT DOCUMENTS

| | | |
|---|---|---|
| CN | 1949272 A | 4/2007 |
| CN | 101071509 A | 11/2007 |
| (Continued) | | |

OTHER PUBLICATIONS

Advisory Action from U.S. Appl. No. 12/864,113, dated Apr. 7, 2015, 3 pages.
(Continued)

*Primary Examiner* — Kyle Zhai
(74) *Attorney, Agent, or Firm* — Nicholson De Vos Webster & Elliott LLP

(57) ABSTRACT

A method for improving performance of generation of digitally represented graphics. The method comprises: receiving a first representation of a base primitive; providing a set of instructions associated with vertex position determination; executing said retrieved set of instructions on said first representation of said base primitive using bounded arithmetic for providing a second representation of said base primitive, and subjecting said second representation of said base primitive to a culling process. A corresponding apparatus and computer program product are also presented.

25 Claims, 9 Drawing Sheets

Related U.S. Application Data

(60) Provisional application No. 61/062,635, filed on Jan. 29, 2008.

(51) Int. Cl.
  G06T 1/60 (2006.01)
  G06T 15/80 (2011.01)

(56) References Cited

U.S. PATENT DOCUMENTS

| | | | |
|---|---|---|---|
| 6,462,740 | B1 | 10/2002 | Immel |
| 7,068,272 | B1 | 6/2006 | Voorhies et al. |
| 7,400,325 | B1 | 7/2008 | Gimby et al. |
| 7,847,798 | B1 | 12/2010 | Parenteau et al. |
| 2003/0117398 | A1 | 6/2003 | Hubrecht et al. |
| 2009/0195552 | A1* | 8/2009 | Nystad .................... G06T 11/40 345/611 |

FOREIGN PATENT DOCUMENTS

| | | |
|---|---|---|
| JP | H106215151 A | 8/1994 |
| JP | H111197357 A | 7/1999 |
| JP | 2001501349 A | 1/2001 |
| JP | 2003006671 A | 1/2003 |
| JP | 2006506744 A | 2/2006 |
| JP | 2007164557 A | 6/2007 |
| JP | 2007310797 A | 11/2007 |
| WO | 9906957 A1 | 2/1999 |
| WO | 2004046881 A2 | 6/2004 |
| WO | 2008091198 A1 | 7/2008 |

OTHER PUBLICATIONS

Advisory Action from U.S. Appl. No. 12/864,113, dated Aug. 16, 2016, 3 pages.
Advisory Action from U.S. Appl. No. 12/864,113, dated Dec. 22, 2015, 3 pages.
Advisory Action from U.S. Appl. No. 12/864,113, dated Jan. 9, 2014, 3 pages.
Advisory Action from U.S. Appl. No. 12/864,113, dated Sep. 8, 2014, 4 pages.
Akenine-Moller T., et al, "Real-Time Rendering," Second Edition, A.K. Peters, Ltd., 2002, chapter 9.2, pp. 357-358, chapter 9.7, pp. 368-369.
Bartz D., et al., "Tighter Bounding Volumes For Better Occlusion Culling Performance," Technical Report WSI-2005-13, Department of Computer Science, Jul. 2005, XP002682977, Universitat Tubingen ISSN: 0946-3852. Downloaded from the Internet: http://www.gris.uni-tuebingen.de/lehrstuhl./publikationen/show/2.html on Sep. 5, 2012, 12 pages.
Berz M., et al., "Computation and Application of Taylor Polynomials with Interval Reminder Bounds," Kluwer Academic Publishers, vol. 4, Issue 1, Feb. 1998, pp. 83-97.
European Search Report and Written Opinion for corresponding EP patent application 09251870, dated Sep. 26, 2012, 8 pages.
Final Office Action from U.S. Appl. No. 12/864,113, dated Feb. 5, 2015, 20 pages.
Final Office Action from U.S. Appl. No. 12/864,113, dated Jun. 16, 2016, 28 pages.
Final Office Action from U.S. Appl. No. 12/864,113, dated Jun. 30, 2014, 20 pages.
Final Office Action from U.S. Appl. No. 12/864,113, dated Nov. 4, 2013, 22 pages.
Final Office Action from U.S. Appl. No. 12/864,113, dated Oct. 19, 2015, 28 pages.
Govindaraju N. K., et al., "Fast and Reliable Collision Culling Using Graphics Hardware," IEEE Transactions on Visualization and Computer Graphics, Mar. 1, 2006, vol. 12 (2), pp. 143-154.
Grinspun E., et al., "Normal Bounds for Subdivision-surface Interference Detection," Proceedings of the conference on Visualization '01, 2001, pp. 333-340.
Han C.Y., et al., "Geometry Engine Architecture with Early Backface Culling Hardware," Computers & Graphics, vol. (3), 2005, pp. 415-425.
Hasselgren J., et al., "Automatic Pre-Tessellation Culling," ACM Transactions on Graphics, Apr. 2009, vol. 28 (2), XP002682979, ACM USA, ISSN: 0730-0301, 10 pages.
Hasselgren J., et al., "PCU: The Programmable Culling Unit," Lund University, ACM Transactions on Graphics, Proceedings of ACM SIGGRAPH 2007, vol. 26 (3), 10 pages.
Heidrich W., et al., "Sampling Procedural Shaders Using Affine Arithmetic," ACM, vol. 17 (3), Jul. 1998, pp. 158-176.
International Preliminary Report on Patentability for Application No. PCT/SE2009/000022 dated Jul. 27, 2010, 9 pages.
International Search Report and Written Opinion for Application No. PCT/SE2009/000022, dated Apr. 29, 2009, 13 pages.
Non-Final Office Action from U.S. Appl. No. 12/864,113, dated Dec. 30, 2016, 25 pages.
Non-Final Office Action from U.S. Appl. No. 12/864,113, dated Feb. 5, 2014, 26 pages.
Non-Final Office Action from U.S. Appl. No. 12/864,113, dated Feb. 24, 2016, 26 pages.
Non-Final Office Action from U.S. Appl. No. 12/864,113, dated Jul. 2, 2013, 24 pages.
Non-Final Office Action from U.S. Appl. No. 12/864,113, dated Jun. 29, 2015, 26 pages.
Non-Final Office Action from U.S. Appl. No. 12/864,113, dated Oct. 29, 2014, 20 pages.
Notice of Allowance from U.S. Appl. No. 12/864,113, dated Jul. 18, 2017, 8 pages.
Office Action from foreign counterpart Japanese Patent Application No. 2010-543083, dated Nov. 25, 2011, 7 pages.
Zhang X., et al., "Continuous Collision Detection for Articulated Models Using Taylor Models and Temporal Culling," ACM Transactions on Graphics, Jul. 2007, ACM vol. 26 (3), pp. 15-1-15-10.
Abi-Ezzi S.S., et al., "Fast Dynamic Tessellation of Trimmed NURBS Surfaces," Computer Graphics Forum, EUROGRAPHICS '94, vol. 13 (3), 1994, pp. C107-C126.
Examination Report under Section 18(3) from foreign counterpart Great Britain Patent Application No. 1012145.7, dated Jan. 30, 2012, 2 pages.
Kanazawa Y., et al., "Displaying Intuitively Correct Space Curves and Surfaces," IEEE, Mar. 4, 1999, pp. 53-58.
Kumar S., et al., "Interactive Display of Large NURBS Models," IEEE Transactions on Visualization and Computer graphics, vol. 2 (4), Dec. 1996, pp. 323-336.
Notice of Allowance from U.S. Appl. No. 12/864,113, dated Dec. 21, 2017, 17 pages.
Notification of Reasons for Refusal from foreign counterpart Japanese Patent Application No. 2012-209479, dated Oct. 22, 2013, 6 pages.
Notification to Grant Patent Right for Invention from foreign counterpart Chinese Patent Application No. 200980103541.4, dated Sep. 24, 2013, 4 pages.
Office Action from foreign counterpart German Patent Application No. 112009000180.7, dated Sep. 5, 2012, 19 pages.
Redon S., et al., "Fast Continuous Collision Detection for Articulated Models," ACM Symposium on Solid Modeling and Applications, 2004, pp. 145-156.
Second Office Action and Search Report from foreign counterpart Chinese Patent Application No. 200980103541.4, dated Nov. 20, 2012, 18 pages.
Third Office Action and Search Report from foreign counterpart Chinese Patent Application No. 200980103541.4, dated Apr. 18, 2013, 17 pages.

* cited by examiner

METHOD, APPARATUS, AND COMPUTER PROGRAM PRODUCT FOR IMPROVED GRAPHICS PERFORMANCE

FIELD OF THE INVENTION

The present invention relates to digitally represented graphics and more particularly to a method, an apparatus and a computer program product for improving the performance of generating digitally represented graphics.

BACKGROUND OF THE INVENTION

Digitally represented graphics, such as computer graphics, is continuously improving in performance. In the 1980's and 1990's, display adapters for computers and game consoles appeared with graphics accelerators, offloading the Central Processing Unit (CPU) in graphics generation. Initially, the display adapters offered acceleration of 2D graphics, but eventually these also included support for accelerated 3D graphics. Modern display adapters use a processing unit often named a graphics processing unit (GPU).

Due to the complexity of 3D graphics, GPU:s of today use a significant amount of their processing power to perform calculations related to 3D graphics.

A continuous problem with display adapters is performance. There are always new applications and games requiring higher frame rates (rendered screen images per second), higher resolutions and higher image quality, resulting in requirements that each screen image should be rendered in a short a time as possible. In other words, it is always important to increase performance.

One way known to increase performance is to increase the processing power of the GPU:s by enabling higher clock speeds, pipelining, or exploiting parallel computations. However, this often generates more heat, resulting in more power consumption and higher fan noise for cooling the GPU. Power consumption and heat is a major constraint and bottleneck for mobile devices. Moreover, there are limits to the clock speeds of each GPU.

Consequently, there is still a problem with insufficient abilities to improve performance in digitally represented graphics.

SUMMARY OF THE INVENTION

In view of the above, an objective of the invention is to solve or at least reduce the problems discussed above.

Generally, the above objectives are achieved by the attached independent patent claims.

According to a first aspect, the present invention is realized by a method for improving performance of generation of digitally represented graphics. The method comprises: receiving a first representation of a base primitive; providing a set of instructions associated with vertex position determination; executing said set of instructions on said first representation of said base primitive using bounded arithmetic for providing a second representation of said base primitive; and subjecting said second representation of said base primitive to a culling process. Performing culling on base primitives is advantageous in that base primitives, and representations of base primitives, may be discarded at the beginning of the graphics pipeline, which results in performance gains. Furthermore, a majority of surfaces being invisible in the fully rendered image are not forwarded in the process, which also results in performance gains. In other words, performing culling on entire base primitives is advantageous in that tessellation of the majority of invisible surfaces is avoided, which results in performance gains.

In computer graphics, a vertex comprises data associated with a location in space. For example, a vertex may be all data associated with a corner of a primitive. The vertices are associated not only with three spatial coordinates but also with other graphical information necessary to render objects correctly, such as colours, reflectance properties, textures, and surface normals.

A connected set of vertices can be used to define a primitive. A primitive may for example be a triangle, quadrilateral, polygon, or other geometric form or, alternatively, a primitive may for example be a surface or a point in space. A primitive that is represented as a triangle has for example three vertices and a quadrilateral has four vertices.

The method may comprise selecting at least one vertex from said first representation of said base primitive, executing a set of instructions associated with vertex position determination on a first representation of said at least one vertex for providing a second representation of said at least one vertex, and subjecting said second representation of said at least one vertex to a culling process, wherein an outcome of said culling process comprises one of a decision to cull said at least one vertex, and a decision not to cull said at least one vertex, and in case the outcome of said culling process comprises a decision to cull said at least one vertex, perform: said receiving a first representation of a base primitive, said providing a set of instructions associated with vertex position determination, said executing said set of instructions on said first representation of said base primitive using bounded arithmetic for providing a second representation of said base primitive, and said subjecting said second representation of said base primitive to a culling process. This is advantageous since it results in performance gains. If for example the outcome of the culling process is a decision not to cull said at least one vertex, it yields a method which is less capacity expensive as compared to the method according to the first aspect.

The method may comprise determining a bounding volume enclosing said second representation of said base primitive; and subjecting said bounding volume to a culling process. This is advantageous in that no predetermined bounds have to be provided and the bounding volume is determined automatically.

The method may comprise executing a tessellation process, wherein said tessellation process is based on an outcome of said culling process. Hence, culling is performed before tessellation. Performing the tessellation after the culling results in performance gains since fewer base primitives are tessellated and is thus advantageous. Said culling process could be the culling process that the second representation is subjected to and/or the culling process that the bounding volume is subjected to.

The method may comprise that said culling process is replaceable. This is advantageous in that the culling process may be amended by for example a user. The culling process being replaceable applies to all embodiments of the first aspect.

The method may comprise that the bounded arithmetic is at least one from the group of Taylor arithmetic, interval arithmetic, and affine arithmetic. This is advantageous in that the method is flexible and supports different types of bounded arithmetic and is not restricted to one type of bounded arithmetic. It is preferred to use Taylor models since curved surfaces and subdivision schemes, which are often used in tessellation, are often based on polynomials. Another advantage is that polynomial computations can be represented exactly by Taylor models (provided that they are of high enough order) which leads to very tight bounds.

The method may comprise that the determining of said bounding volume further comprises computing a minimum and a maximum of said second representation. This is advantageous in that it is a performance-efficient way to determine the bounding volume.

The method may comprise that said second representation is at least one from the group of a positional bound, and a normal bound. The positional and normal bound may be used for determining for example the position or range of the first representation of the base primitive. A further advantage is that the positional and normal bound are determined automatically.

The method may comprise that executing said set of instructions further comprises: deriving a second set of instructions from said set of instructions associated with vertex position determination, and executing said second set of instructions for providing a normal bound. This is advantageous in that the second set of instructions is derived automatically and, furthermore, the normal bound is computed automatically.

The method may comprise that subjecting said bounding volume to said culling process further comprises performing at least one of subjecting said bounding volume to view frustum culling, subjecting said bounding volume to back-face culling, and subjecting said bounding volume to occlusion culling. An advantage with this is that many different culling techniques are applicable.

The method may comprise that subjecting said second representation (being a positional or normal bound) to said culling process further comprises performing at least one of subjecting said positional bound to view frustum culling, subjecting said positional bound or said normal bound to back-face culling, and subjecting said positional bound to occlusion culling. An advantage with this is that many different culling techniques are applicable.

The method may comprise that an outcome of said culling process comprises one of a decision to discard said base primitive, and a tessellation factor. This is advantageous since discarding a base primitive implies a base primitive less to render which increases performance. The tessellation factor may indicate that the base primitive is not to be tessellated which results in performance gain.

The method may comprise executing a tessellation process, in case the outcome of said culling process comprises a tessellation factor. This is advantageous in that performance is gained for every base primitive that is not tessellated or less tessellated. If the outcome of said culling process is a decision to discard said base primitive, no tessellation process is executed.

According to a second aspect, the present invention is realized by an apparatus adapted to generate digitally represented graphics comprising circuitry for improving performance of generation of digitally represented graphics. Said circuitry is adapted to: receive a first representation of a base primitive; provide a set of instructions associated with vertex position determination; execute said set of instructions on said first representation of said base primitive using bounded arithmetic for providing a second representation of said base primitive; and subject said second representation of said base primitive to a culling process.

It is to be noted that the second aspect of the invention can be embodied with any combination of features corresponding to any of the features of the first aspect of the invention.

The advantages of the first aspect are equally applicable to the second aspect.

According to a third aspect, the present invention is realized by a computer program product, comprising computer program code which is stored on a computer-readable storage medium and which, when executed on a processor, performs the method according to the first aspect of the invention. The advantages of the first aspect are equally applicable to the third aspect of the invention.

Other objectives, features and advantages of the present invention will appear from the following detailed disclosure, from the attached claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

Other features and advantages of the present invention will become apparent from the following detailed description of a presently preferred embodiment, with reference to the accompanying drawings, in which.

DETAILED DESCRIPTION

The present invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

Figure 1:
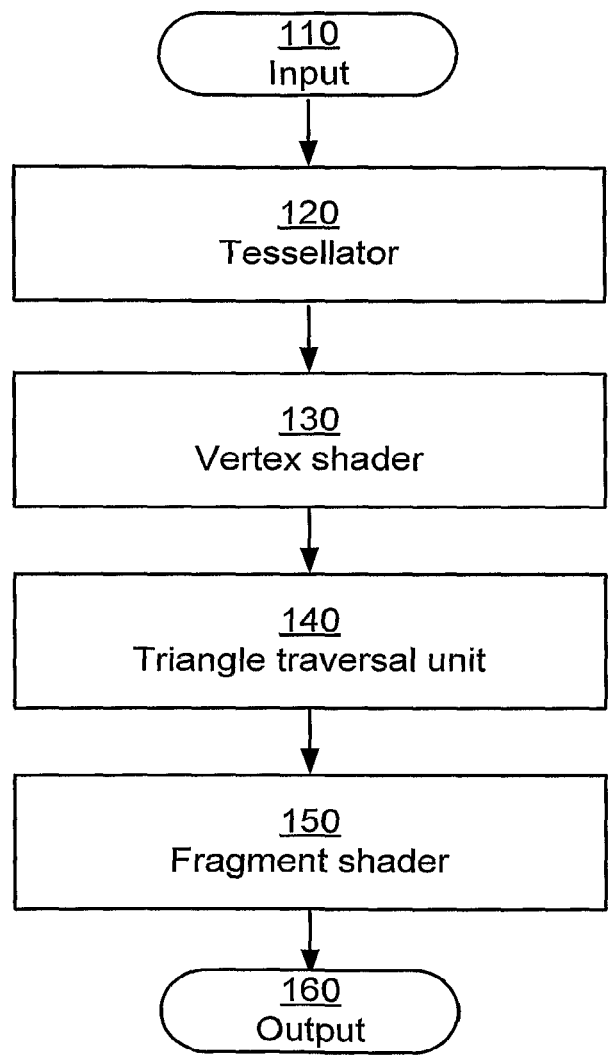
FIG. 1 is a block diagram illustrating how different entities, in a display adapter according to prior art, interact.

FIG. 1 is a block diagram illustrating how different entities, in a conventional display adapter known to a person skilled in the art, interact. A display adapter according to prior art may comprise a tessellator 120, a vertex shader 130, a triangle traversal unit 140, and a fragment shader 150. The entities of the display adapter according to prior art are well known to the person skilled in the art.

The input 110 to the tessellator 120 is base primitive, which may be a triangle, quadrilateral, or other geometric form. Tessellation implies that many smaller, often connected primitives are created. For example, a base triangle (i.e., the base primitive) is in the tessellator 120 tessellated into 100×100 smaller, connected triangles covering the base triangle. The position of the vertices of these smaller triangles can then be computed in the vertex shader unit 130, so that a curved surface is formed.

Different types of tessellation exist, for example uniform tessellation, fractional tessellation, and adaptive tessellation.

The vertex shader unit 130 receives barycentric coordinates for every vertex from the tessellator 120 and computes for example the position, $p(u,v)$, of the vertex as a function of the barycentric coordinates $(u,v)$.

The triangle traversal unit 140 is responsible for setting up polygons as instructed by a connected controller. Although any polygon can be used, triangles are commonly used. For each polygon, the triangle traversal unit 140 divides the polygon to be rendered into one or more tiles, where each tile is at least partly overlapped by the polygon. In general, a tile is a group of fragments. A tile is a two-dimensional rectangle containing a number of fragments. Each of these fragments correspond to a pixel and contain all data required to render the pixel and to test whether the pixel should be rendered on the screen. A common size of a tile is 8 by 8 fragments, although any tile size is within the scope of the invention.

Another important task of the triangle traversal unit 140 is to find the fragments that are inside the geometric primitive (e.g., triangle) being rendered. This can be done using a variety of techniques, the techniques being known to a person skilled in the art.

The fragment shader 150 executes a fragment shader program for each fragment passed to this unit. Each of these fragments correspond to a pixel and contain data required to render the pixel and to test whether the pixel should be rendered on the screen. The fragment data includes raster position, depth, colour, texture coordinates, stencil, alpha (used for blending), etc. For every pixel there may exist a plurality of fragment samples.

The fragments are further processed in order to for example combine previously evaluated colour with textures, as well as to add effects such as fog, as well as to, when possible, identify fragments that do not need to be rendered, i.e. fragment culling.

The fragment shader 150 may further perform depth testing, alpha testing, and blending before the fragments are written to target buffers.

The output 150 from the display adapter according to prior art may be displayed on a display.

It is to be noted that from here on, the present invention will be described.

Different embodiments of an apparatus adapted to generate digitally represented graphics according to the invention will be described below with reference to FIG. 2. The apparatus comprises circuitry for improving performance of generation of digitally represented graphics. Said apparatus may be embodied as a display adapter and will hereinafter be referred to as a display adapter.

Figure 2A:
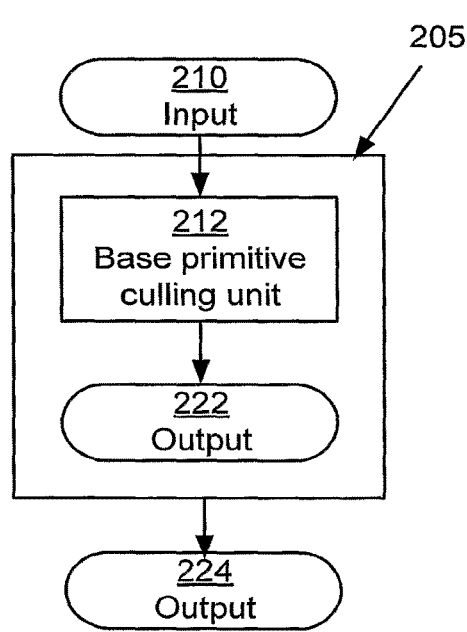
FIG. 2a is a block diagram illustrating how different entities in an apparatus may interact in an embodiment of the present invention.

FIG. 2a is a block diagram illustrating an embodiment of a display adapter 205 according to the present invention. The display adapter 205 comprises circuitry for improving performance of generation of digitally represented graphics, forming a base primitive culling unit 212.

The input 210 to the base primitive culling unit 212 is first representation of a base primitive. A geometric primitive in the field of computer graphics is usually interpreted as atomic geometric objects that the system can handle, for example draw or store. All other graphics elements are built up from these primitives.

The base primitive is a suitable geometrical representation which can be tessellated into many smaller geometric primitives, such as triangles. A base primitive is non-tessellated. Examples of base primitives are triangles, quadrilaterals, lines, curves, Bézier surfaces, etc.

Polygons are defined using a connected set of vertices. A triangle has for example three vertices and a quadrilateral has four vertices. In computer graphics, the vertices are associated not only with three spatial coordinates but also with other graphical information necessary to render the object correctly, such as colours, reflectance properties, textures, and surface normals.

A first representation of a base primitive may be a set of attributes. The set of attributes may for example be one from the group of control point, vertex position, normal, texture coordinate, etc. For example, a triangle can be described using three vertex positions, and a quadrilateral polygon using four vertex positions as well. Each vertex position may also be associated with other attributes, such as normals and texture coordinates. Another example is a Bezier triangle or patch, which can be described using a set of vertex positions and control points.

In the base primitive culling unit 212, culling is performed on base primitives and on representations of base primitives. The output 222 from the base culling unit may be that the base primitive is to be discarded. In another embodiment, an output 222 may be that a tessellation factor is created. This tessellation factor may be set to a value indicating that the base primitive is to be discarded. Alternatively, the tessellation factor may be set to a value indicating that the base primitive could not be discarded. Furthermore, the tessellation factor may be set to a value indicating that the base primitive is not to be tessellated, is to be tessellated coarsely, or is to be tessellated at a low rate.

The details and effects of the base primitive culling are further described in conjunction with FIG. 3a and FIG. 3b, below.

The output 224 from the display adapter 205 may be displayed on a display.

Figure 2B:
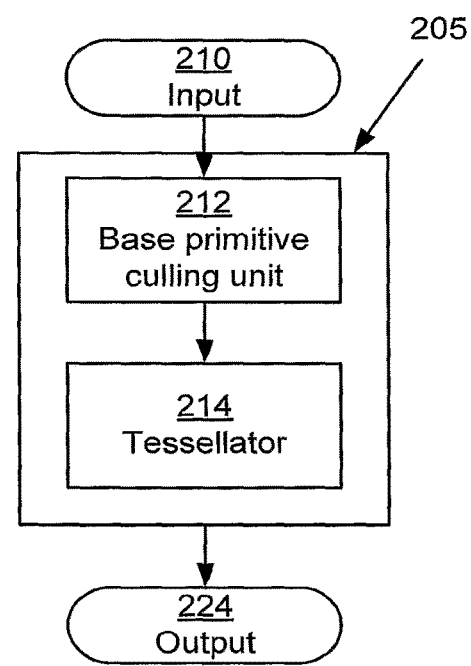
FIG. 2b is a block diagram illustrating an embodiment of the present invention.

In another embodiment, see FIG. 2b, the display adapter 205 comprises a base primitive culling unit 212 and a tessellator 214. The tessellator 214 may be of similar type as the tessellator 120 described above with reference to FIG. 1.

The base primitive culling unit 212, the input 210 to the base primitive culling unit 212 and the output 224 from the display adapter 205 have been previously described in connection with FIG. 2a.

If the tessellator 214 receives, from the base primitive culling unit 212, a base primitive and a tessellation factor indicating that the base primitive is not to be tessellated, the tessellator does not tessellate the base primitive.

If the tessellator 214 receives, from the base primitive culling unit 212, a base primitive but does not receive a tessellation factor indicating that the base primitive is not to be tessellated, the tessellator 214 tessellates the base primitive.

Figures 2C, 2D:
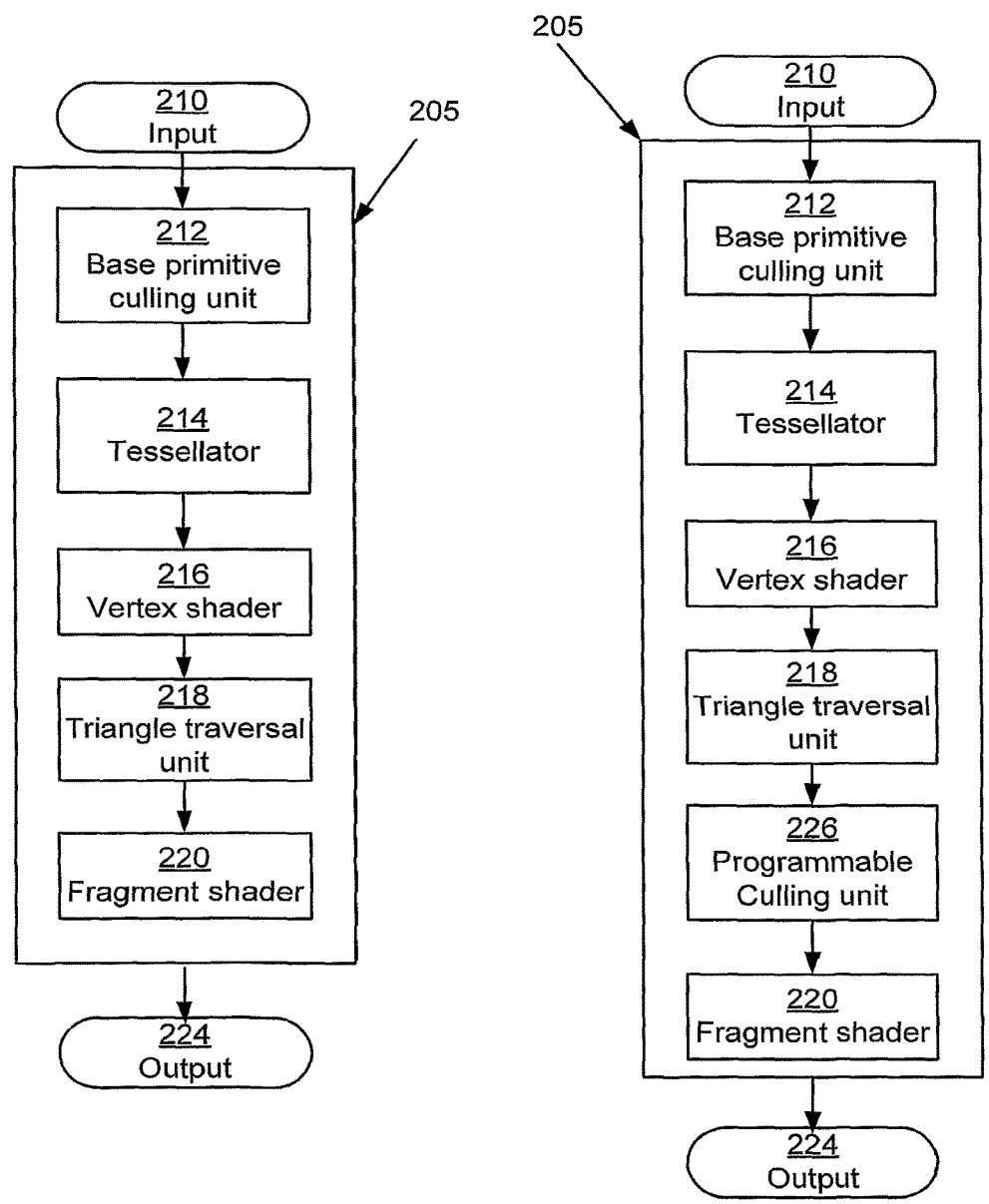
FIG. 2c is a block diagram illustrating an embodiment of the present invention.
FIG. 2d is a block diagram illustrating an embodiment of the present invention.

FIG. 2c is a block diagram illustrating how different entities in a display adapter 205 may interact in an embodiment of the present invention. The display adapter 205 comprises a base primitive culling unit 212, a tessellator 214, a vertex shader 216, a triangle traversal unit 218, and a fragment shader 220. The entities 214, 216, 218, and 220 may be of similar type as those described above with reference to FIG. 1.

The base primitive culling unit 212, the input 210 to the base primitive culling unit 212 and the output 224 from the display adapter 205 have been previously described in connection with FIG. 2a.

In yet another embodiment, see FIG. 2d, the display adapter 205 comprises a base primitive culling unit 212, a tessellator 214, a vertex shader 216, a triangle traversal unit 218, a programmable culling unit (PCU) 226, and a fragment shader 220. The entities 214, 216, 218, and 220 may be of the same or similar type as those described above with reference to FIG. 1. The base primitive culling unit 212, the input 210 to the base primitive culling unit 212 and the output 224 from the display adapter 205 have been previously described in connection with FIG. 2a.

In the programmable culling unit 226, culling is performed on tiles according to a replaceable culling program, also known as a replaceable culling module. The details of this culling program and the effects are explained in more detail in the non-published Swedish patent application SE0700162-1, the content of which is hereby incorporated by reference.

Figure 2E:
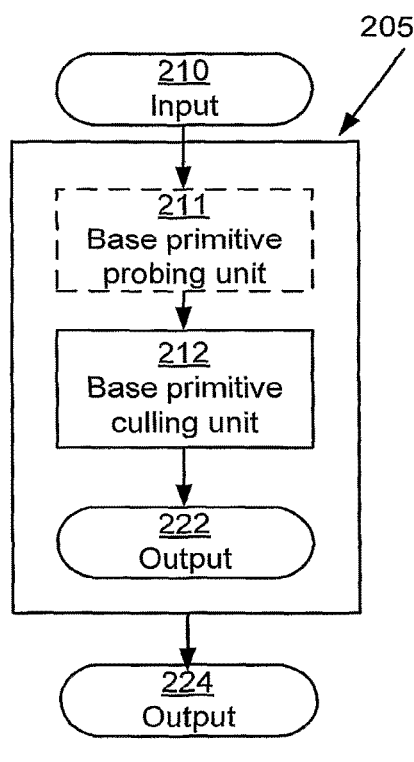
FIG. 2e is a block diagram illustrating an embodiment of the present invention.

The display adapter 205 of FIG. 2a may further comprise a base primitive probing unit 211, see FIG. 2e. The base primitive probing unit 211 is arranged to check if at least one vertex of a base primitive can be culled. At least one vertex from the base primitive is selected. The at least one vertex can for example be the vertices of the base primitive or the centre of the base primitive. If the at least one vertex of the base primitive cannot be culled it implies that the base primitive cannot be culled and then it is better not to perform the base primitive culling in the base primitive culling unit 212 since base primitive culling is capacity demanding.

Figure 2F:
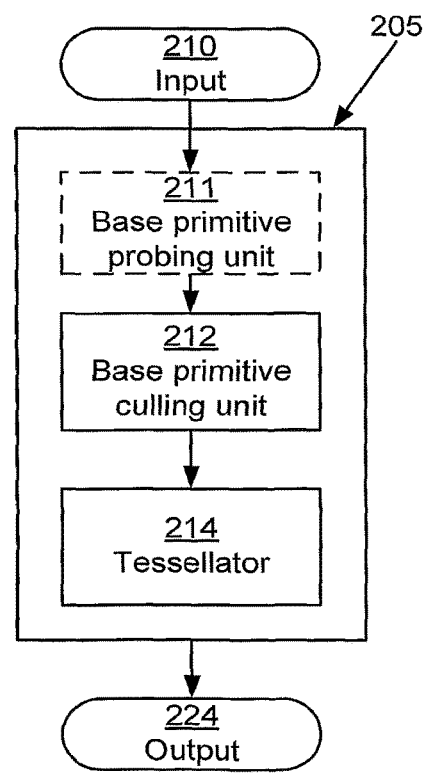
FIG. 2f is a block diagram illustrating an embodiment of the present invention.
Figure 2G:
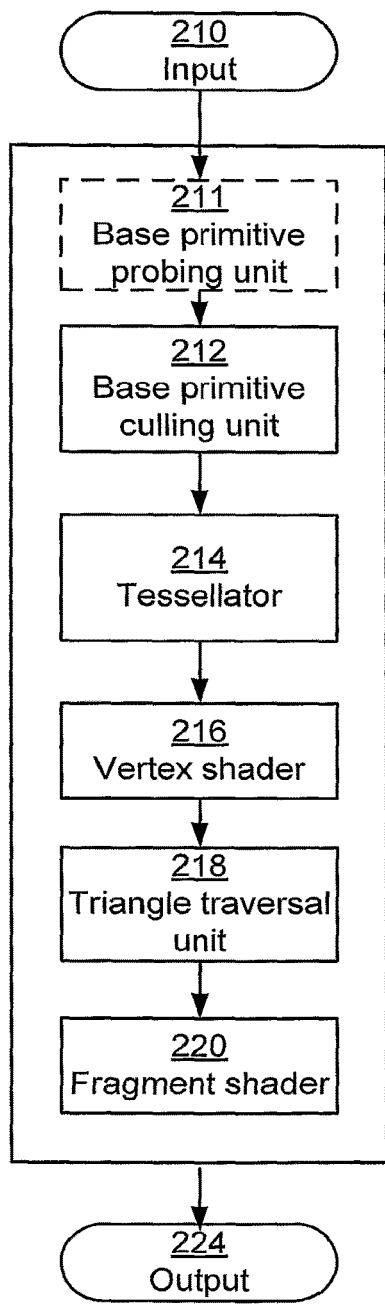
FIG. 2g is a block diagram illustrating an embodiment of the present invention.
Figure 2H:
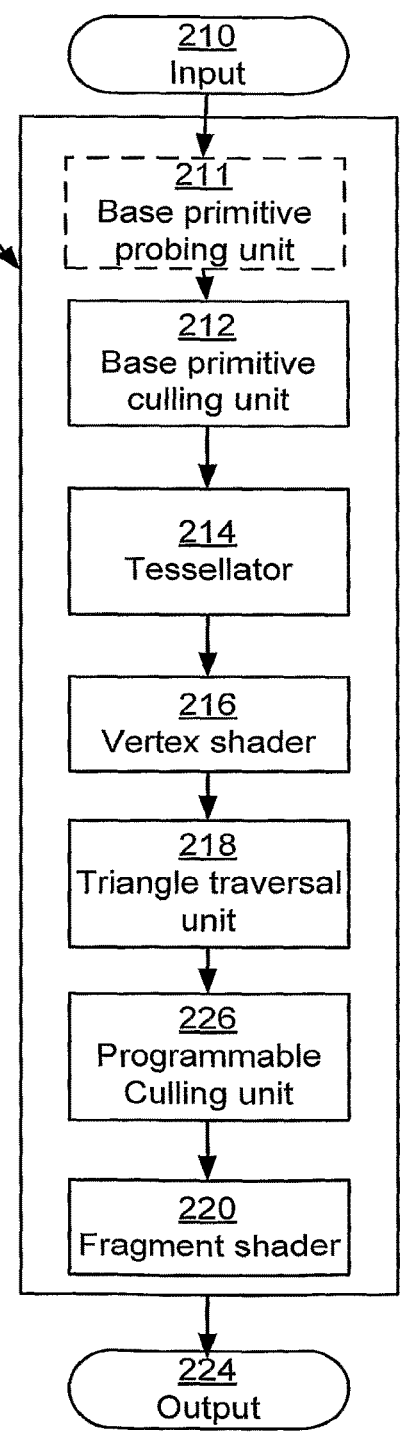
FIG. 2h is a block diagram illustrating an embodiment of the present invention.

As is shown in FIG. 2f the display adapter 205 of FIG. 2b may further comprise a base primitive probing unit 211. Furthermore, the display adapter 205 of FIG. 2c may comprise a base primitive probing unit 211, see FIG. 2g. The display adapter 205 of FIG. 2d may comprise a base primitive probing unit, see FIG. 2h.

Figure 3A:
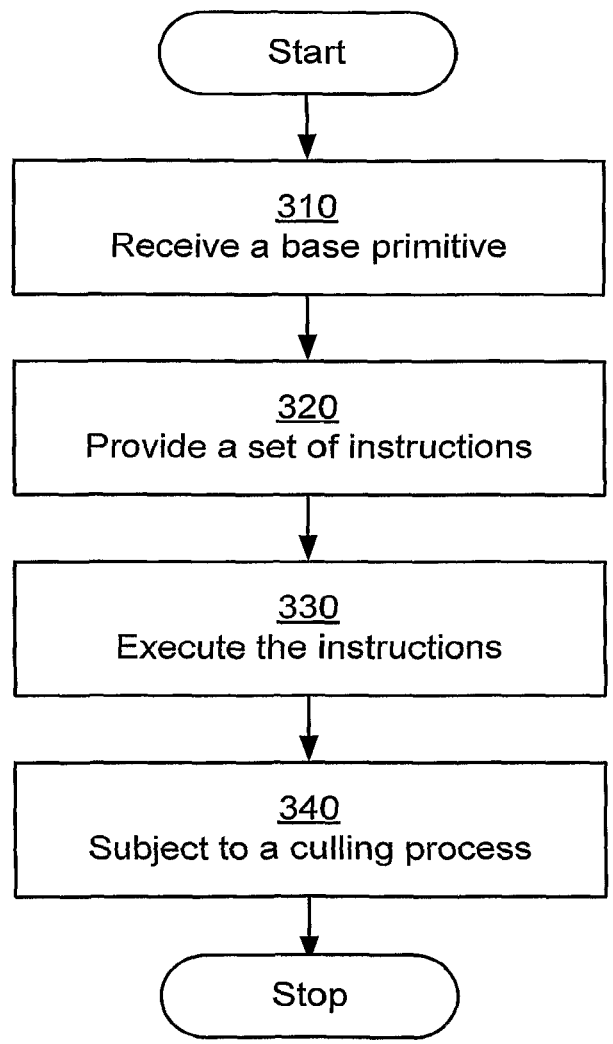
FIGS. 3a and 3b are flowcharts showing base primitive culling processes that can be executed in the apparatus of FIGS. 2a-d.

FIG. 3a shows a flow chart for a base primitive culling program that can be executed in the base primitive culling unit 212 of FIGS. 2a, b, c, and d.

In step 310, a first representation of a base primitive is received.

In step 320, a set of instructions is provided. The provided set of instructions is associated with vertex position determination. Vertex positions are for example computed using barycentric coordinates for every vertex as p(u,v), as described in connection with the vertex shader unit 216. The set of instructions is derived or retrieved from a vertex shader program which can be executed in the vertex shader unit 216. The set of instructions is then analysed and all instructions that are used to compute the vertex position, the arithmetic instructions, are isolated. The instructions are redefined into operating on bounded arithmetic, for example Taylor arithmetic, interval arithmetic, affine arithmetic, or another suit-able arithmetic known to a person skilled in the art. In one embodiment, the instructions are redefined into operating on Taylor models (instead of floating point numbers) and the input to the new instructions is redefined into being Taylor models.

A brief description of Taylor models follows in order to facilitate the understanding of the following steps.

Intervals are used in Taylor models, and the following notation is used for an interval:

$$\hat{a} = [\underline{a}, \overline{a}] = \{x \mid \underline{a} \leq x \leq \overline{a}\} \quad \text{equation (1)}$$

Given an n+1 times differentiable function, $f(u)$, where $u \in [u_0, u_1]$, the Taylor model of $f$ is composed of a Taylor polynomial, $T_f$, and an interval remainder term, $\hat{r}_f$. An nth order Taylor model, here denoted $\tilde{f}$, over the domain $u \in [u_0, u_1]$ is then:

$$\tilde{f}(u) \in \sum_{k=0}^{n} \frac{f^{(k)}(u_0)}{k!} \cdot (u - u_0)^k + [\underline{r_f}, \overline{r_f}] = \sum_{k=0}^{n} c_k u^k + \hat{r}_f, \quad \text{equation (2)}$$

wherein $$\sum_{k=0}^{n} \frac{f^{(k)}(u_0)}{k!} \cdot (u - u_0)^k$$

is the Taylor polynomial and $\lfloor \underline{r_f}, \overline{r_f} \rfloor$ is the interval remainder term. This representation is called a Taylor model, and is a conservative enclosure of the function $f$ over the domain $u \in [u_0, u_1]$. It is also possible to define arithmetic operators on Taylor models, where the result is a conservative enclosure as well (another Taylor model). As a simple example, assume that $f+g$ is to be computed, and that these functions are represented as Taylor models, $\tilde{f} = (T_f, \hat{r}_f)$ and $\tilde{g} = (T_g, \hat{r}_g)$. The Taylor model of the sum is then $(T_f + T_g, \hat{r}_f + \hat{r}_g)$. More complex operators like multiplication, sine, log, exp, reciprocal, etc., can also be derived. Implementation details for these operators are described in BERZ, M., AND HOFFSTÄTTER, G. 1998, Computation and Application of Taylor Polynomials with Interval Remainder Bounds, *Reliable Computing*, 4, 1,83-97.

The barycentric coordinates may be redefined as a Taylor model, as follows: $\tilde{b}ary(u,v) = (u, v, 1-u-v)$.

In step 330, the provided set of instructions is executed on the first representation of the base primitive using bounded arithmetic. An outcome of this executing of said set of instructions is a second representation of the base primitive.

Said second representation of the base primitive may be a Taylor model and may be a polynomial approximation of the vertex position attribute. More specifically, the output from step 330 may be positional bounds: $\tilde{p}(u,v) = (\tilde{p}_x, \tilde{p}_y, \tilde{p}_z, \tilde{p}_w)$ that is four Taylor models. For a single component, for example x, this can be expressed in the power basis as follows (the remainder term, rf has been omitted for clarity):

$$p(u, v) = \sum_{i+j \leq n} a_{ij} u^i v^j \quad \text{equation (3)}$$

The bounded arithmetic used in step 330 may for example be Taylor arithmetic, interval arithmetic, affine arithmetic, or another suitable arithmetic known to a person skilled in the art.

In one embodiment, said second representation of said base primitive may be normal bounds. For a parameterized surface, the unnormalized normal, n, can be computed as:

$$n(u, v) = \frac{\partial p(u, v)}{\partial u} \times \frac{\partial p(u, v)}{\partial v} \quad \text{equation (4)}$$

The normal bounds, that is the Taylor model of the normal, is then computed as $$\tilde{n}(u, v) = \frac{\partial \tilde{p}(u, v)}{\partial u} \times \frac{\partial \tilde{p}(u, v)}{\partial v} \quad \text{equation (5)}$$

Figure 3B:
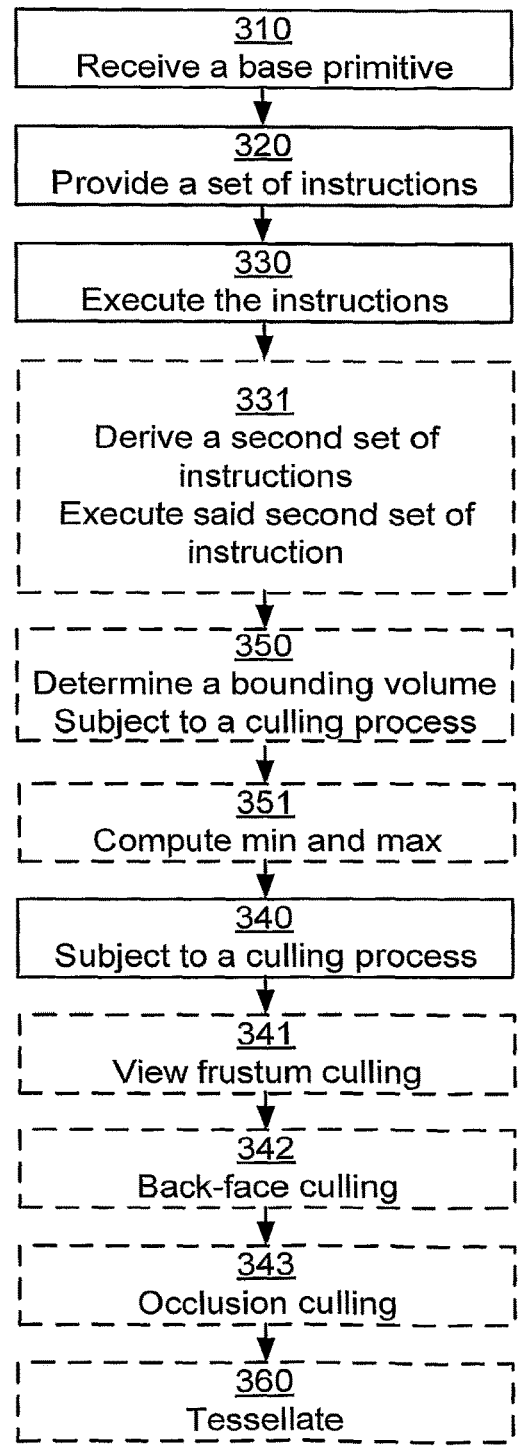

In one embodiment, step 330, executing said set of instructions may comprise step 331, FIG. 3b. Step 331 comprises deriving a second set of instructions from said set of instructions associated with vertex position determination. The second set of instructions is retrieved from a vertex shader program executed in the vertex shader unit 216, the instructions are analysed and all instructions that are used to compute the vertex position, the arithmetic instructions, are isolated. The instructions are redefined into operating on Taylor models (instead of floating point numbers) and the input to the new instructions is redefined into being Taylor models. The second set of instructions is then executed for providing normal bounds.

A bounding volume for a set of objects is a closed volume that completely contains the union of the objects in the set. Bounding volumes may be of various shapes, for example boxes such as cuboids or rectangles, spheres, cylinders, polytopes, and convex hulls.

In one embodiment, a bounding volume enclosing said second representation of said base primitive is determined, step 350 FIG. 3b, and the bounding volume is subject to a culling process. The culling process is further described in connection with step 340.

The inventive bounding volume is a tight bounding volume. The bounding volume being tight implies that the area or volume of the bounding volume is as small as possible but still completely enclosing said second representation of said base primitive.

In one embodiment, the bounding volume is deter-mined by computing a minimum and a maximum of said second representation, step 351.

The second representation of the base primitive may be Taylor polynomials on power form.

One way of determining the bounding volume may be by computing the derivatives of the Taylor polynomials and thus finding the minimum and maximum of the second representation.

Another way to determine the bounding volume may be according to the following. The Taylor polynomials are converted into Bernstein form. Due to the fact that the convex hull property of the Bernstein basis guarantees that the actual surface or curve of the polynomial lies inside the convex hull of the control points obtained in the Bernstein basis, the bounding volume is computed by finding the minimum and maximum control point value in each dimension. Transforming equation 3 into Bernstein basis gives:

$$p(u, v) = \sum_{i+j \leq n} p_{ij} B_{ij}^n(u, v) \quad \text{equation (6)}$$

where $$B_{ij}^n(u, v) = \binom{n}{i}\binom{n-i}{j} u^i v^j (1-u-v)^{n-i-j}$$

are the Bernstein polynomials in the bivariate case over a triangular domain. This conversion is performed using the following formula, the formula being described in HUNGERBÜHLER, R., AND GARLOFF, J. 1998, Bounds for the Range of a Bivariate Polynomial over a Triangle. *Reliable Computing*, 4, 1, 3-13:

$$p_{ij} = \sum_{l=0}^{i} \sum_{m=0}^{j} \frac{\binom{i}{l}\binom{j}{m}}{\binom{n}{l}\binom{n-l}{m}} a_{lm} \quad \text{equation (7)}$$

To compute a bounding box, simply the minimum and the maximum value over all $p_{ij}$ for each dimension, x, y, z, and w are computed. This gives a bounding box, $\hat{b}=(\hat{b}_x, \hat{b}_y, \hat{b}_z, \hat{b}_w)$, in clip space, where each element is an interval, for example $\hat{b}_x = \lfloor \underline{b}_x, \overline{b}_x \rfloor$.

In step 340, said second representation of the base primitive is subject to a culling process.

Culling is performed in order to avoid drawing objects, or parts of objects, that are not seen.

Prior art GPU:s, perform culling on tessellated polygons. The present invention performs culling before tessellation even occurs which results in performance gains.

In this approach, the positional bounds, normal bounds, and bounding volume derived above are used for applying different culling techniques on the base primitive.

In one embodiment, view frustum culling is per-formed using said positional bound or said bounding volume, step 341 FIG. 3b.

In one embodiment, back-face culling is performed using at least one from the group of said normal bound, said positional bound, and said bounding volume, step 342 FIG. 3b.

In one embodiment, occlusion culling is performed using said positional bound or said bounding volume, step 343 FIG. 3b.

In one embodiment, at least one of the steps 341-343 is performed.

The culling techniques disclosed below are not be construed as limiting but they are provided by way of example. It is obvious to a person skilled in the art that back-face culling, occlusion culling, and view frustum culling may be performed using various different techniques than the ones described below.

View frustum culling is a culling technique based on the fact that only objects that will be visible, that is that are located inside the current view frustum, are to be drawn. The view frustum may be defined as the region of space in the modelled world that may appear on the screen. Drawing objects outside the frustum would be a waste of time and resources since they are not visible anyway. If an object is entirely outside the view frustum, it cannot be visible and can be discarded.

In one embodiment the positional bounds of the bounding volume are tested against the planes of the view frustum. Since the bounding volume, b, is in homogeneous clip space, the test may be performed in clip space. A standard optimization for plane-box tests may be used, where only a single corner of the bounding volume, the bounding volume being a bounding box, is used to evaluate the plane equation. Each plane test then amounts to an addition and a comparison.

For example, testing if the volume is outside the left plane is performed using: $\overline{b_x}+\overline{b_w}<0$. The testing may also be performed using the positional bounds, $\tilde{p}(u,v)=(\tilde{p}_x, \tilde{p}_y, \tilde{p}_z, \tilde{p}_w)$. Since these tests are time- and resource efficient, it is advantageous to let the view frustum test be the first test.

Back-face culling discards objects that are facing away from the viewer, that is the normal vector of the object is directed away from the viewer. These objects will not be visible and there is hence no need to draw them.

Given a point, p(u, v) on a surface, back-face culling is in general computed as:

$$c=p(u,v)\cdot n(u,v) \quad \text{equation (8)}$$

where n(u, v) is the normal vector at (u, v). If c>0, then p(u, v) is back-facing for that particular value of (u, v). As such, this formula can also be used to cull an entire triangle, which has only a single normal. The Taylor model of the dot product (see equations 5 and 8) is computed: $\tilde{c}=\tilde{p}(u, v)\cdot\tilde{n}(u,v)$. To be able to back-face cull, the following must hold over the entire triangle domain: $\tilde{c}>0$. The lower bound on $\tilde{c}$ is conservatively estimated again using the convex hull property of the Bernstein form. This gives an interval, $\tilde{c}=[\underline{c},\overline{c}]$, and the triangle (which has not been tessellated at this point) can be culled if $\underline{c}>0$.

In another embodiment interval bounds are computed for the normals, for checking if the back-face condition is fulfilled.

The testing may also be performed using the positional bounds, $\tilde{p}(u,v)=(\tilde{p}_x, \tilde{p}_y, \tilde{p}_z, \tilde{p}_w)$ or alternatively, the bounding volume.

Occlusion culling implies that objects that are occluded are discarded. In the following, occlusion culling is described for a bounding box but it is obvious to a person skilled in the art that it is possible to perform occlusion culling on other types of bounding volumes as well.

The occlusion culling technique is very similar to hierarchical depth buffering, except that only a single extra level is used (8×8 pixel tiles) in the depth buffer. The maximum depth value, $Z_{max}^{tile}$, is stored in each tile. This is a standard technique in GPUs used when rasterizing triangles. The clip-space bounding box, b, is projected and all tiles overlapping this axis-aligned box are visited. At each tile, the classic occlusion culling test is performed: $Z_{min}^{box} \geq Z_{max}^{tile}$, which indicates that the box is occluded at the current tile if the comparison is fulfilled. The minimum depth of the box, $Z_{min}^{box}$, is obtained from the clip-space bounding box, and the maximum depth of the tile, $Z_{max}^{tile}$, from the hierarchical depth buffer (which already exists in a contemporary GPU). Note that the testing can be terminated as soon as a tile is found to be non-occluded, and that it is straightforward to add more levels to the hierarchical depth buffer. The occlusion culling test can be seen as a very inexpensive prerasterizer of the bounding box of the triangle to be tessellated. Since it operates on a tile basis, it is less expensive than an occlusion query.

In another embodiment, the testing may also be performed using the positional bounds, $\tilde{p}(u,v)=(\tilde{p}_x, \tilde{p}_y, \tilde{p}_z, \tilde{p}_w)$.

In one embodiment, the culling process is replaceable. This implies that the base primitive culling unit 212 may be supplied with a user-defined culling process.

Step 340 (and 350), executing a culling process, may have different outcomes. In one embodiment, an outcome of the culling process may be that the base primitive is to be discarded. In another embodiment, an outcome of the culling process may be that a tessellation factor is created. This tessellation factor may be set to a value indicating that the base primitive is to be discarded. Alternatively, the tessellation factor may be set to a value indicating that the base primitive could not be discarded. Furthermore, the tessellation factor may be set to a value indicating that the base primitive is not to be tessellated.

In one embodiment, after step 340 (and step 350) executing a culling process, the outcome of the executing of a culling process is sent to the tessellator 214. A tessellation process is executed, step 360 FIG. 3b. If the tessellator 214 receives a base primitive and a tessellation factor indicating that the base primitive is not to be tessellated, the tessellator does not tessellate the base primitive.

If the tessellator 214 receives a base primitive that was not discarded in the culling process but does not receive a tessellation factor indicating that the base primitive is not to be tessellated, the tessellator 214 tessellates the base primitive.

The steps described in connection with FIGS. 3a and b may be performed in the apparatus 205.

Figure 4:
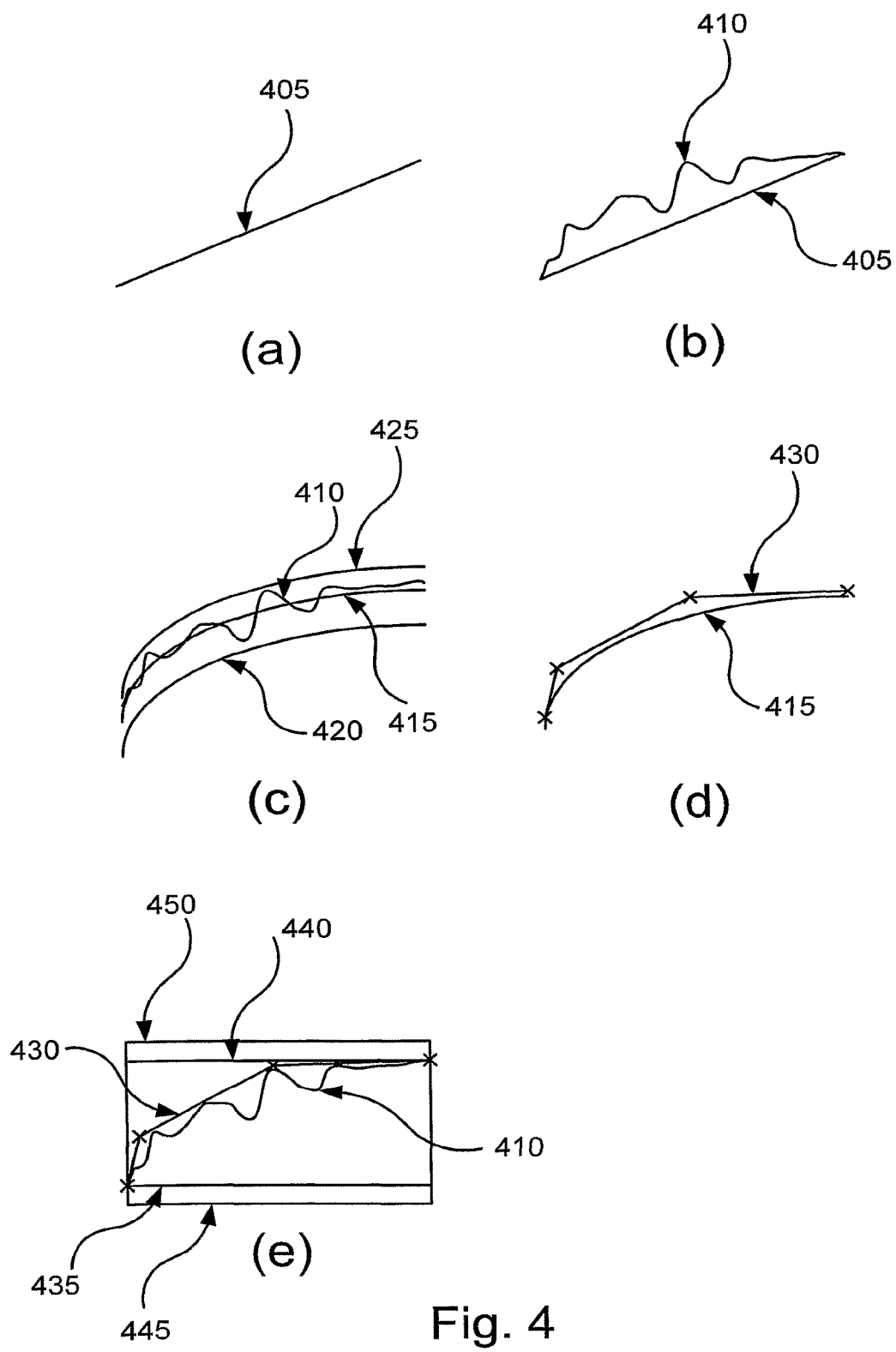
FIG. 4 schematically illustrates the base primitive culling processes of FIGS. 3a-b.

FIG. 4 illustrates the results in the steps of FIGS. 3a and b. FIG. 4a depicts a base primitive in the form of a base triangle 405. FIG. 4b shows the resulting generated surface 410 over the base triangle 405 which is determined by the vertex shader unit 216 (and the tessellation frequency). In FIG. 4c the base triangle 405 is expressed in Taylor form (polynomial 415 and interval remainder 420, 425), thus obtaining a conservative estimate of the surface 410. In FIG. 4d, the Taylor polynomial is expanded in Bernstein form 430 for efficient range bounding (using the convex hull property). In FIG. 4e, the interval remainder term 420, 425 is added from the Taylor model to the Bernstein bounds 430, thus obtaining conservative surface bounds 445, 450.

Figure 5:
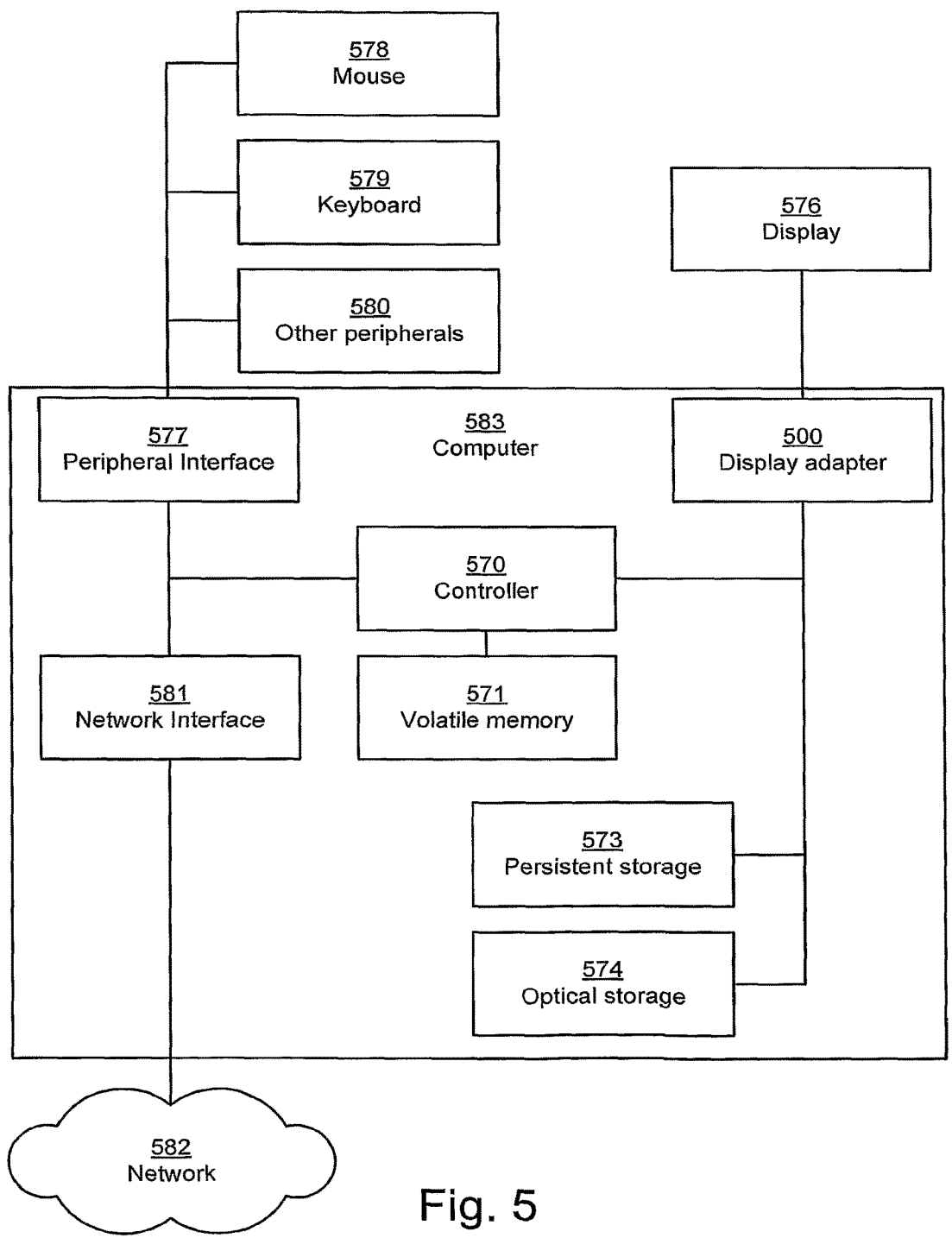
FIG. 5 shows an overview architecture of a typical general purpose computer embodying the apparatus of FIGS. 2a-d.

FIG. 5 shows an overview architecture of a typical general purpose computer 583 embodying the display adapter 205 of FIG. 2. The computer 583 has a controller 570, such as a CPU, capable of executing software instructions. The controller 570 is connected to a volatile memory 571, such as a random access memory (RAM) and a display adapter 500, the display adapter corresponding to the display adapters 205 of FIG. 2. The display adapter 500 is in turn connected to a display 576, such as a CRT monitor, an LCD monitor, etc. The controller 570 is also connected to persistent storage 573, such as a hard drive or flash memory and optical storage 574, such as reader and/or writer of optical media such as CD, DVD, HD-DVD or Blue-ray. A network interface 581 is also connected to the controller 570 for providing access to a network 582, such as a local area network, a wide area network (e.g. the Internet), a wireless local area network or wireless metropolitan area network. Through a peripheral interface 577, e.g. interface of type universal serial bus, wireless universal serial bus, firewire, RS232 serial, Centronics parallel, PS/2, the controller 570 can communicate with a mouse 578, a keyboard 579 or any other peripheral 580, including a joystick, a printer, a scanner, etc.

It is to be noted that although a general purpose computer is described above to embody the invention, the invention can equally well be embodied in any environment where digital graphics, and in particular 3D graphics, is utilized, e.g. game consoles, mobile phones, MP3 players, etc.

The invention may furthermore be embodied in a much more general-purpose architecture. The architecture may for example consists of many small processor cores that can execute any type of program. This implies a kind of a software GPU, in contrast to more hardware-centric GPU:s.

The invention has mainly been described above with reference to a few embodiments. However, as is readily appreciated by a person skilled in the art, other embodiments than the ones disclosed above are equally possible within the scope of the invention, as defined by the appended patent claims.

We claim:

1. A graphics processing unit comprising:
   first circuitry to determine a first bounding region for a first set of graphics primitives, wherein the first bounding region is to enclose one or more of the first set of graphics primitives;
   second circuitry to perform back-face culling on the first set of graphics primitives based on the first bounding region, wherein some of the first set of graphics primitives are removed as a result of the back-face culling to generate a second set of graphics primitives;
   third circuitry to perform tessellation of the second set of graphics primitives to generate a third set of graphics primitives;
   fourth circuitry to determine whether one or more of the third set of graphics primitives overlap at least a first tile of a plurality of image tiles of an image frame, the fourth circuitry to identify a fourth set of graphics primitives which contribute to image data within the first tile;
   fifth circuitry to perform vertex shading on input vertices of one or more of the fourth set of graphics primitives to generate output vertices having modified positional attributes; and
   sixth circuitry to generate output pixels based on the output vertices;
   a frame buffer to store the output pixels;
   wherein the first circuitry, the second circuitry, the third circuitry, the fourth circuitry, fifth circuitry, and sixth circuitry are integrated within one or more processing elements configured to execute graphics commands.

2. The graphics processing apparatus as in claim 1 further comprising:
   a depth buffer to store depth data associated with one or more of the output pixels.

3. The graphics processing apparatus as in claim 2 further comprising:
   depth test circuitry to perform depth testing of a current pixel using depth data stored in the depth buffer.

4. The graphics processing apparatus as in claim 1 wherein the fourth circuitry is to cull graphics primitives that do not contribute to image data within the first tile to generate the fifth set of graphics primitives.

5. The graphics processing apparatus as in claim 1 wherein positional bounds of the first bounding volume are tested against planes of a view to determine whether to cull one or more of the first set of graphics primitives based on the view.

6. The graphics processing apparatus as in claim 1 wherein said fifth circuitry is to select at least one vertex from a primitive, execute a set of instructions associated with a vertex position determination for the at least one vertex, provide a new representation of the at least one vertex, and cull the new representation of the at least one vertex.

7. A method comprising:
   determining a first bounding region for a first set of graphics primitives, wherein the first bounding region is to enclose one or more of the first set of graphics primitives;
   performing back-face culling on the first set of graphics primitives based on the first bounding region, wherein some of the first set of graphics primitives are removed as a result of the back-face culling to generate a second set of graphics primitives;
   performing tessellation of the second set of graphics primitives to generate a third set of graphics primitives;
   determining whether one or more of the third set of graphics primitives overlap at least a first tile of a plurality of image tiles of an image frame to identify a fourth set of graphics primitives which contribute to image data within the first tile;
   performing vertex shading on input vertices of one or more of the fourth set of graphics primitives to generate output vertices having modified positional attributes; and
   generating output pixels based on the output vertices; and
   storing the output pixels in a frame buffer;
   wherein the operations of determining a first bounding region, performing back-face culling, performing tessellation, determining one or more of a fourth set of graphics primitives overlap at least a first tile, performing vertex shading, generating output pixels, and storing the output pixels are performed by one or more processing elements configured to execute graphics commands.

8. The method as in claim 7 further comprising:
   storing depth data associated with one or more of the output pixels in a depth buffer.

9. The method as in claim 8 further comprising:
   performing depth testing of a current pixel using depth data stored in the depth buffer.

10. The method as in claim 7 further comprising:
    culling graphics primitives that do not contribute to image data within the first tile to generate the fifth set of graphics primitives.

11. The method as in claim 7 wherein positional bounds of the first bounding volume are tested against planes of a view to determine whether to cull one or more of the first set of graphics primitives based on the view.

12. The method as in claim 7 further comprising:
    selecting at least one vertex from a primitive,
    executing a set of instructions associated with a vertex position determination for the at least one vertex,
    providing a new representation of the at least one vertex, and
    culling the new representation of the at least one vertex.

13. A non-transitory machine-readable medium having program code stored thereon which, when executed by a machine, causes the machine to perform the operations of:
    determining a first bounding region for a first set of graphics primitives, wherein the first bounding region is to enclose one or more of the first set of graphics primitives;
    performing back-face culling on the first set of graphics primitives based on the first bounding region, wherein some of the first set of graphics primitives are removed as a result of the back-face culling to generate a second set of graphics primitives;
    performing tessellation of the second set of graphics primitives to generate a third set of graphics primitives;
    determining whether one or more of the third set of graphics primitives overlap at least a first tile of a plurality of image tiles of an image frame to identify a fourth set of graphics primitives which contribute to image data within the first tile;

performing vertex shading on input vertices of one or more of the fourth set of graphics primitives to generate output vertices having modified positional attributes; and generating output pixels based on the output vertices; and storing the output pixels in a frame buffer;

wherein the operations of determining a first bounding region, performing back-face culling, performing tessellation, determining one or more of a fourth set of graphics primitives overlap at least a first tile, performing vertex shading, generating output pixels, and storing the output pixels are performed by one or more processing elements configured to execute graphics commands.

14. The machine-readable medium as in claim 13 further comprising program code to cause the machine to perform the operations of:

storing depth data associated with one or more of the output pixels in a depth buffer.

15. The machine-readable medium as in claim 14 further comprising program code to cause the machine to perform the operations of:

performing depth testing of a current pixel using depth data stored in the depth buffer.

16. The machine-readable medium as in claim 13 further comprising program code to cause the machine to perform the operations of:

culling graphics primitives that do not contribute to image data within the first tile to generate the fifth set of graphics primitives.

17. The machine-readable medium as in claim 13 wherein positional bounds of the first bounding volume are tested against planes of a view to determine whether to cull one or more of the first set of graphics primitives based on the view.

18. The machine-readable medium as in claim 13 further comprising program code to cause the machine to perform the operations of:

selecting at least one vertex from a primitive, executing a set of instructions associated with a vertex position determination for the at least one vertex, providing a new representation of the at least one vertex, and culling the new representation of the at least one vertex.

19. A system comprising:

a system memory to store graphics instructions and data; and a graphics processing unit comprising:

first circuitry to determine a first bounding region for a first set of graphics primitives, wherein the first bounding region is to enclose one or more of the first set of graphics primitives;

second circuitry to perform back-face culling on the first set of graphics primitives based on the first bounding region, wherein some of the first set of graphics primitives are removed as a result of the back-face culling to generate a second set of graphics primitives;

third circuitry to perform tessellation of the second set of graphics primitives to generate a third set of graphics primitives;

fourth circuitry to determine whether one or more of the third set of graphics primitives overlap at least a first tile of a plurality of image tiles of an image frame, the fourth circuitry to identify a fourth set of graphics primitives which contribute to image data within the first tile;

fifth circuitry to perform vertex shading on input vertices of one or more of the fourth set of graphics primitives to generate output vertices having modified positional attributes; and sixth circuitry to generate output pixels based on the output vertices;

a frame buffer to store the output pixels;

wherein the first circuitry, the second circuitry, the third circuitry, the fourth circuitry, fifth circuitry, and sixth circuitry are integrated within one or more processing elements configured to execute graphics commands.

20. The system as in claim 19 further comprising:

a central processing unit (CPU) communicatively coupled to the graphics processing unit.

21. The system as in claim 20 further comprising:

a network interface to connect the graphics processing unit and CPU to a network.

22. The system as in claim 20 further comprising:

an input/output (TO) interface to couple the CPU and graphics processing unit to one or more other system components.

23. The system as in claim 20 further comprising:

a persistent storage device coupled to the CPU and graphics processing unit to store program code and data.

24. The system as in claim 19 wherein the system memory comprises a random access memory (RAM).

25. The system as in claim 19 further comprising:

a display adapter to couple the system to an external monitor.

* * * * *